United States Patent [19]
Haussmann et al.
[11] 3,770,897
[45] Nov. 6, 1973

[54] FRAME SYNCHRONIZATION SYSTEM

[75] Inventors: Robert H. Haussmann, Wayne, N.J.; Marvin A. Epstein, Monsey, N.Y.

[73] Assignee: International Telephone and Telegraph Corporation, Nutley, N.J.

[22] Filed: Dec. 6, 1971

[21] Appl. No.: 205,093

[52] U.S. Cl. .......... 179/15 BS
[51] Int. Cl. .......... H04j 3/06
[58] Field of Search .......... 179/15 BS, 15 AF; 178/69.5 R

[56] References Cited

UNITED STATES PATENTS

| | | | |
|---|---|---|---|
| 3,571,516 | 3/1971 | Ohyama | 179/15 BS |
| 3,652,799 | 3/1972 | Thomas | 179/15 BS |
| 3,562,432 | 2/1971 | Gabbard | 179/15 BS |
| 3,127,475 | 3/1964 | Coulter | 179/15 BS |
| 3,317,669 | 5/1967 | Ohnsorge | 178/69.5 R |
| 3,639,838 | 2/1972 | Kuhn | 179/15 BS |
| 3,558,824 | 1/1971 | Ogawa | 179/15 BS |

*Primary Examiner*—Kathleen H. Claffy
*Assistant Examiner*—David L. Stewart
*Attorney*—C. Cornell Remsen, Jr. et al.

[57] ABSTRACT

A binary data transmission system employing a sending station and a receiving station with intermediate stations disposed therebetween in tandem. The binary data signal transmitted by such a system includes in a predetermined time division multiplex frame period M groups of time division multiplex channel data signals, each of the groups of channel signals having a normal sync signal. Each of the intermediate stations and the receiving station monitor the received and transmitted M groups of channel data signals on a time sequential basis. A frame synchronization system detects the lack of sync in any of the groups applied thereto on a time sequential basis and substitutes for the thusly detected erroneous group of channel signals dummy data signals including dummy sync signals. To prevent stations subsequent to the stations substituting the dummy data signals for erroneous normal data signals from providing an erroneous error indication and substitution of dummy data for error free normal data signal, the frame synchronization system detects, establishes and maintains sync of each monitored group of channel signals in response to either the normal sync signal or the dummy sync signal. The frame synchronization system provides a variable search time to establish the desired synchronization to either normal or dummy sync signals for each group of channel data signals coupled thereto.

21 Claims, 7 Drawing Figures

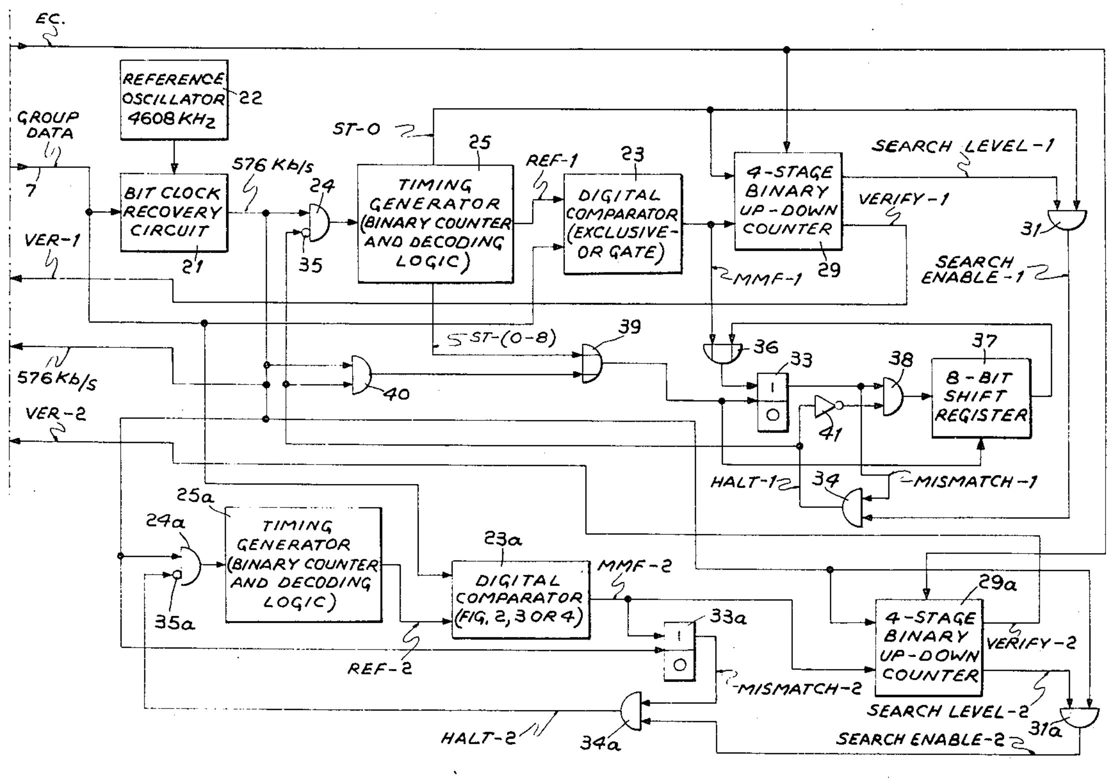
EC.
REFERENCE OSCILLATOR 4608 KHz
22
GROUP DATA
7
BIT CLOCK RECOVERY CIRCUIT
21
576 Kb/s
24
35
ST-0
25
TIMING GENERATOR (BINARY COUNTER AND DECODING LOGIC)
REF-1
23
DIGITAL COMPARATOR (EXCLUSIVE-OR GATE)
4-STAGE BINARY UP-DOWN COUNTER
29
SEARCH LEVEL-1
VERIFY-1
31
SEARCH ENABLE-1
MMF-1
VER-1
ST-(0-8)
39
40
36
33
38
37
8-BIT SHIFT REGISTER
41
576 Kb/s
VER-2
HALT-1
34
MISMATCH-1
25a
24a
35a
TIMING GENERATOR (BINARY COUNTER AND DECODING LOGIC)
23a
DIGITAL COMPARATOR (FIG. 2, 3 OR 4)
MMF-2
33a
29a
4-STAGE BINARY UP-DOWN COUNTER
VERIFY-2
REF-2
MISMATCH-2
SEARCH LEVEL-2
31a
HALT-2
34a
SEARCH ENABLE-2

INVENTORS
ROBERT H. HAUSSMANN
BY MARVIN A. EPSTEIN
Alfred C. Hill
AGENT

INVENTORS
ROBERT H. HAUSSMANN
BY MARVIN A. EPSTEIN
Alfred C. Hill
AGENT

INVENTORS
ROBERT H. HAUSSMANN
BY MARVIN A. EPSTEIN
Alfred C. Hill
AGENT

FRAME SYNCHRONIZATION SYSTEM

BACKGROUND OF THE INVENTION

This invention relates to PCM (pulse code modulation) or binary data transmission systems and more particularly to a frame synchronization system therefore.

In certain binary data transmission systems which incorporate a transmitting station and a receiving station with intermediate stations disposed therebetween in tandem and where the frame of the data signal transmitted on such a system is composed of M groups of time division multiplex channel signals, each of the M groups containing their own sync signal, it is necessary that each station, the intermediate station and the receiving station, monitor both the receive groups and the transmit groups to determine whether the groups are actually in synchronization and, if not, to adjust timing waveforms with respect to the monitored group to establish and maintain the desired synchronization.

Where it is required to monitor the RCM group input and output signals to detect the presence of either normal group sync pattern or a dummy sync pattern, it is necessary to have a frame synchronization system that will establish and maintain synchronization on either of the two possible sync patterns. Where there is up to 16 group signals (eight input and eight output) to be monitored, it is possible to employ 16 separate monitors each capable of recognizing either of the two acceptable sync patterns (normal or dummy sync) or 32 circuits each looking for one particular pattern. As is obvious the amount of equipment necessary is voluminous and, therefore, would add a large number of circuits to the station equipment, thereby, making the station equipment complex and cumbersome.

Another important requirement for the frame synchronization system to monitor the input and output group channel signals is that the frame or sync acquisition time be long enough to assure a high probability of acquiring synchronism when there is a good signal present. This is necessary to keep the probability of a "false alarm" low enough to satisfy the performance of the specification imposed upon the multiplexers of the stations. When a "false alarm" occurs this causes substitution of a dummy signal for a good PCM group signal, thereby interrupting the group traffic. This type of temporary traffic interruption would be considered a failure of group bit count integrity. The probability of a "false alarm" occurrence, together with the probabilities of other occurrences which affect the group bit count integrity, must result in mean time between group bit count integrity failures which satisfies the performance specification of the station.

A simple frame or group sync recovery logic looking for the normal PCM frame sync pattern would have an average search time of nine milliseconds plus two milliseconds verify time. The addition of a simple "look-ahead" technique and circuitry therefore as fully disclosed in U.S. Pat. No. 3,594,502 issued to J. M. Clark on July 20, 1971, whose disclosure is incorporated herein by reference, can reduce this average search time to 3 milliseconds acquisition time plus 2 milliseconds verify time, or a total of 5 milliseconds. With no bit errors, the maximum search time is simply double the average search tiem. Including a random bit error distribution of one in a thousand makes the maximum search time approach infinity if an infinite number of trials is considered. This means that it is then not possible to pick maximum sync search time which will guarantee no false alarms. Also, it is not possible to select a fixed sync search time that will take advantage of the short average sync search time and give a low enough probability of producing a false alarm.

SUMMARY OF THE INVENTION

An object of the present invention is to provide a time-shared frame synchronization system overcoming the disadvantages of known prior art for monitoring the synchronization of two or more group time multiplexed binary data channel signals.

An object of the present invention is to provide a frame synchronization signal having a variable length search time which overcomes the disadvantages of the prior art fixed length search time arrangements.

A feature of the present invention is the provision of a frame synchronization system for a time division multiplex binary data station comprising: at least a first source of binary data signals including in each of a predetermined length frame period M time multiplexed groups of time multiplexed channel signals, each of the M groups of channel signals including one of *m* different sync signals, where M and *m* are integers greater than one; an input; a first means coupled to the first source and the input to couple the M groups of channel signals time sequentially to the input; a second means to produce a first timing signal equal to the bit rate of the binary data signal; m third means coupled to the input, each of the *m* third means responding to a different one of the *m* sync signals, each of the *m* third means examining successive bits in each of the M groups within each of the frame period to determine the presence of its associated one of the *m* sync signals and to produce a control signal in the absence of its associated one of the *m* sync signals in a given number of successive bits; and *m* fourth means coupled to the output of a different associated one of the *m* third means and between the second means and the input of the associated one of the *m* third means responsive to the associated one of the control signals to control the phase of the first timing signal with respect to each of the M groups to establish and maintain synchronization.

Another feature of the present invention is the provision of a frame synchronization system for a time division multiplex binary data station having the components as outlined immediately hereinabove and in addition including fifth means coupled to each of the third means and the first means to provide a variable length of time (search time) to establish the synchronization when anyone of the control signals indicates an out-of-synchronization condition.

Still another feature of the present invention is the provision of a frame synchronization system for a time division multiplex binary data system comprising: a source of binary data time division multiplex signals including in each of a predetermined length frame period at least one sync signal; first means to produce a timing signal equal to the bit rate of the binary data signals; second means coupled to the source and the first means to examine successive bits in each of the frame period to determine the presence of the sync signal and to produce from the examination a phase control signal in the absence of the sync signal in a given number of successive bits; third means coupled to the second means and the first means responsive to the control signal to control the phase of the timing signal coupled to the second means to establish and maintain synchronization; and fourth means coupled to the second means to provide a variable length of time to establish the synchronization when the control signal indicates an out-of-synchronization condition.

BRIEF DESCRIPTION OF THE DRAWINGS

Above-mentioned and other features and objects of this invention will become more apparent by reference to the following description taken in conjunction with the accompanying drawing, in which.

DESCRIPTION OF THE PREFERRED EMBODIMENTS

Figures 1A, 1C:
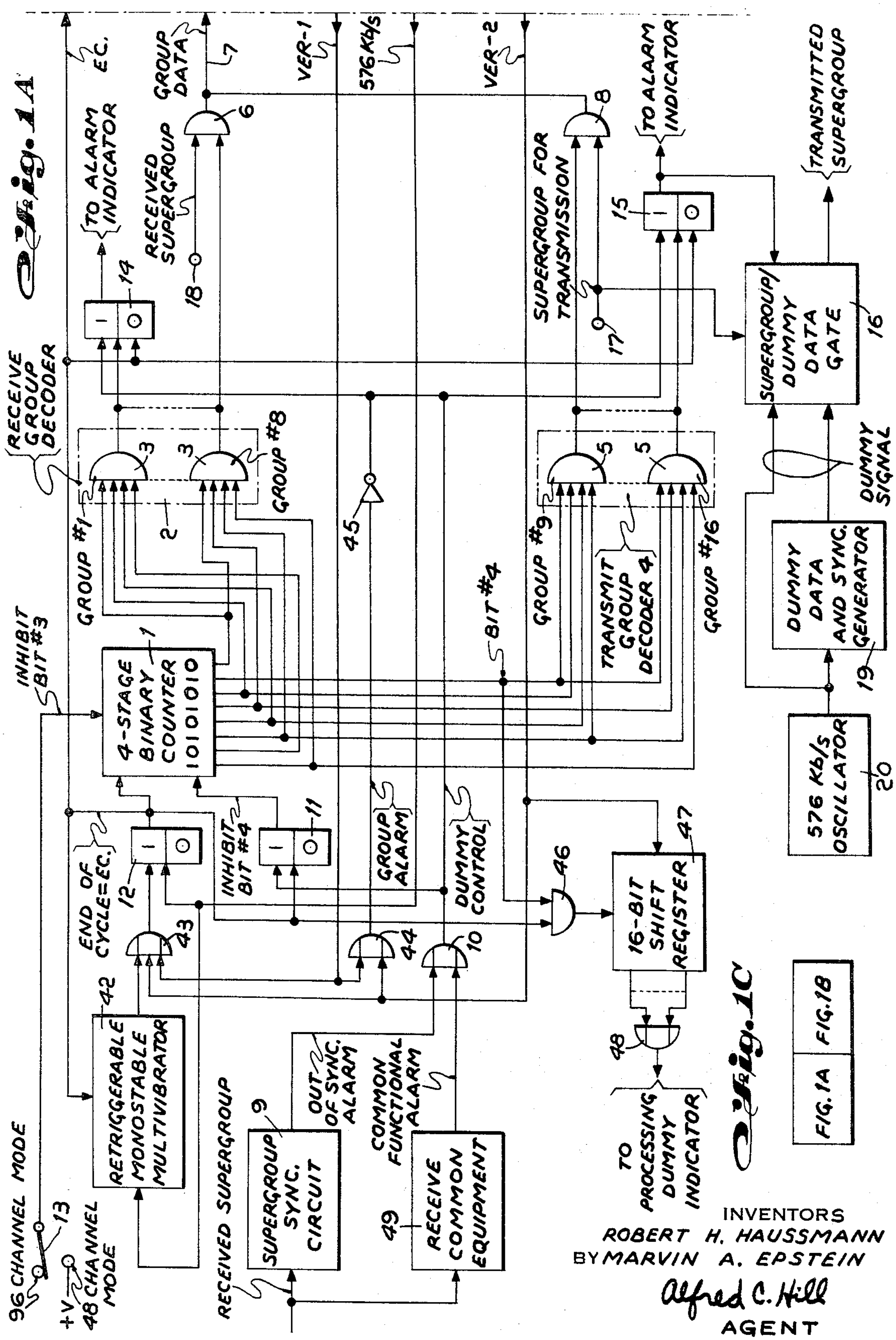
FIGS. 1A and 1B, when organized as illustrated in FIG. 1C, is a schematic diagram in block form of one embodiment of a frame synchronization system in accordance with the principles of the present invention.

Before proceeding with the detailed description of the frame synchronization system of this invention with respect to the drawing, the advantages of the objects outlined hereinabove will be discussed.

A time-shared frame synchronization system has different requirements than a frame synchronization system which must continuously monitor only one sync signal. The continuous monitoring frame synchronization system need not have a stringent frame acquisition time requirement, but it is important that its mean time between false loss of frame occurrences be quite long.

The time-shared frame synchronization system must have a very rigid mean acquisition time. This is necessary to keep the average time between successive "looks" at a given group of channel signals short enough to prevent the propagation of a faulty signal down the line for a duration long enough to activate the alarms of succeeding stations. Of course, a time-shared cyclic synchronizing or monitoring system to establish synchronization will allow a faulty signal to be propagated for some finite length of time, but this can be kept to less than the built-in delay of the alarms in the succeeding stations.

Rather than having a fixed sync search time, the present frame synchronization system has a variable length search time which will be terminated by the occurrence of the first one of two verify signals that indicates verification of the establishment of synchronization to either the normal or dummy frame sync pattern, or the end of a cycle time calculated to guarantee a low enough probability of false alarm to satisfy equipment operating specifications. For example, if the system designed employs a counter type integrator which is used to keep tract of frame bit matches has a count threshold of four (e.g., after four successive matches it requires more than one bit error, or mismatch, to produce a new search), and it is desired to guarantee a false alarm rate on a pergroup basis of less than one in 100 days, or less than one in 200 days for each transmit and receive end it is found that a maximum search time of about 32 milliseconds is required. It can be shown that for the $10^{-3}$ bit error rate the average search time is increased an insignificant amount. With 32 millisecond limit per search, the maximum time between searches for one group (of 16 monitored groups) is 0.512 seconds.

The advantage of the variable length search time is that the maximum search time can be increased to provide a lower probability of false alarms occurrence while the average search time remains constant.

Another consideration is whether to use one search logic which can recognize either of two patterns, normal group sync or dummy sync, or to use two individual search circuits and logically OR the results. The single search approach must allow for the fact that two different sync patterns will agree part of the time and when they disagree that information is useless. Therefore, the available information for recognizing frame sync is effectively less for each pattern than when they are inspected independently, and the average search time will become longer (typically twice as long). Also, since the presence of dummy data must be noted while monitoring the receive groups, additional logic must be added and the savings realized with a single search circuit do not justify this approach.

Therefore, in accordance with the present invention two separate sync search circuits are employed which have three significant advantages. (1) A three-bit dummy pattern (e.g., 110110 . . . or 001001 . . . ) has a three-bit frame length with resultant fast acquisition (approximately 0.1 milliseconds average) rather than the bit frame length of the normal sync pattern wherein the normal sync are alternate ones and zeros every frame period. (2) No "look-ahead" feature (above-cited U.S. Pat. No. 3,594,502) is required for the faster dummy sync search logic, therefore, the two circuits do not double the required logic. (3) The recognized pattern is immediately known to be normal sync pattern for a dummy sync pattern with no further decoding required.

It should be kept in mind that hereinabove and in the description that follows certain values for bit rate, clock rates, the number of sync patterns employed as well as the number of groups being applied to the frame synchronization system of the present invention are specifically mentioned. These values, however, are only for purposes of explanation and may be altered in any manner to meet the desired operating specification of the frame synchronization system in accordance with the principles of the present invention. For instance, a normal and a dummy sync pattern have already been discussed and will be discussed hereinbelow with respect to the circuitry of the embodiment illustrated in the drawing. However, the concept of the present invention is capable of operating with *m* different sync signals, where *m* is an integer greater than one, in other words, two, three, four or more. In addition, there has been mentioned 16 groups, eight receive groups and eight transmit groups. This, of course, can be altered and can be referred to as M groups of time multiplex channel signals, where M is an integer greater than one, in other words, two, three, four or more and, of course, not restricted to 16 as referred to hereinabove and in the following description. Other values for the various components of the system as a whole can be altered to comply with the operating specification of the equipment in which the frame synchronization system of this invention is to be employed.

Referring to FIG. 1A, four-stage binary counter 1 in conjunction with receive group decoder 2 including AND gates 3 and transmit group decoder 4 including AND gates 5 will produce 16 different time positions or group gate pulses so as to sequentially gate the eight receive groups through AND gate 6 to input 7 and to sequentially gate the eight transmit groups through AND gate 8 to input 7. The manner of producing the sixteen group gate signals by AND gates 3 and 5 is accomplished by appropriately connecting the binary 1 and binary 0 of each state of counter 1 to the appropriate ones of the AND gates as illustrated in the following table.

TABLE

| Group | Bits 1 2 3 4 | |
|---|---|---|
| 1 | 0 0 0 0 | |
| 2 | 1 0 0 0 | |
| 3 | 0 1 0 0 | |
| | | Receive Groups |
| 4 | 1 1 0 0 | |
| 5 | 0 0 1 0 | |
| 6 | 1 0 1 0 | |
| 7 | 0 1 1 0 | |
| 8 | 1 1 1 0 | |
| 9 | 0 0 0 1 | |
| 10 | 1 0 0 1 | |
| 11 | 0 1 0 1 | |
| 12 | 1 1 0 1 | |
| 13 | 0 0 1 1 | Transmit Groups |
| 14 | 1 0 1 1 | |
| 15 | 0 1 1 1 | |
| 16 | 1 1 1 1 | |

In addition, when the receive logic of the stations has a supergroup frame alarm condition (out-of-sync alarm), as detected by the supergroup sync circuit 9 which is more fully described in the copending application of J. M. Clark (11), Ser. No. 251,895, Filed May 10, 1972, whose disclosure is incorporated herein by reference, bit number 4 of counter 1 will be inhibited and only the group gate signals of decoder 2 will be produced to gate the received groups into input 7. During this time the dummy signal will be substituted for all eight transmit groups. Bit number 4 of counter 1 is inhibited through means of a binary 1 being present on the out-of-sync alarm conductor of circuit 9 which is coupled through OR gate 10 to the 1 input of flip flop 11 to produce the binary 1 condition necessary to inhibit bit number 4 when triggered by a binary 1 output of retiming flip flop 12 whose operation will be described more fully hereinbelow.

The arrangement just described is for a 96 channel operation mode as selected by switch 13. When switch 13 is moved to its other contact to provide a 48 channel operating mode, a positive voltage such as +V is coupled to counter 1 to inhibit the third bit of counter 1 so only the first four transmit and receive groups will be coupled to input 7.

The group gate outputs of decoders 2 and 4 not only enable the sequential gating of the receive and transmit groups to input 7, but also enable alarm flip flops 14 and 15 which stores the alarm condition generated, as will be described hereinbelow, between searches. Through means of the 1 output of alarm flip flop 15 supergroup/dummy data gate 16 is activated to enable an alarm condition to cause substitution of dummy data for the group data that caused the alarm condition. Gate 16 has applied thereto the supergroup data signal coupled to terminal 17 for transmission and the output of the dummy data and sync generator 19 together with the dumming timing from oscillator 20 which controls generator 19 at the bit rate of 576 kilobits per second (Kb/s). Generator 19 may have the circuitry of generator 25*a* illustrated in FIG. 2 to provide a succession of 1 and 0 binary bits having the desired pattern.

The point at which each group signal is monitored requires some consideration. It is desirable, of course, to monitor the signals at the interface between the propagation medium equipment (e.g., cable equipment) and the station equipment with external connections, but this is not realizable or practical for the following reasons: (1) the receive group monitoring point must be before the switch where the dummy substitution is made. If it were after this switch, then the monitor would be alternating between PCM group and dummy signals with each cycle with an alternating alarm/no alarm condition; (2) the transmit group monitoring could be done right at the received signal, but this would require analog switching since the received signal is not at equipment logic levels. It is more practical to switch the signals after the input interface circuit.

Figure 1B:
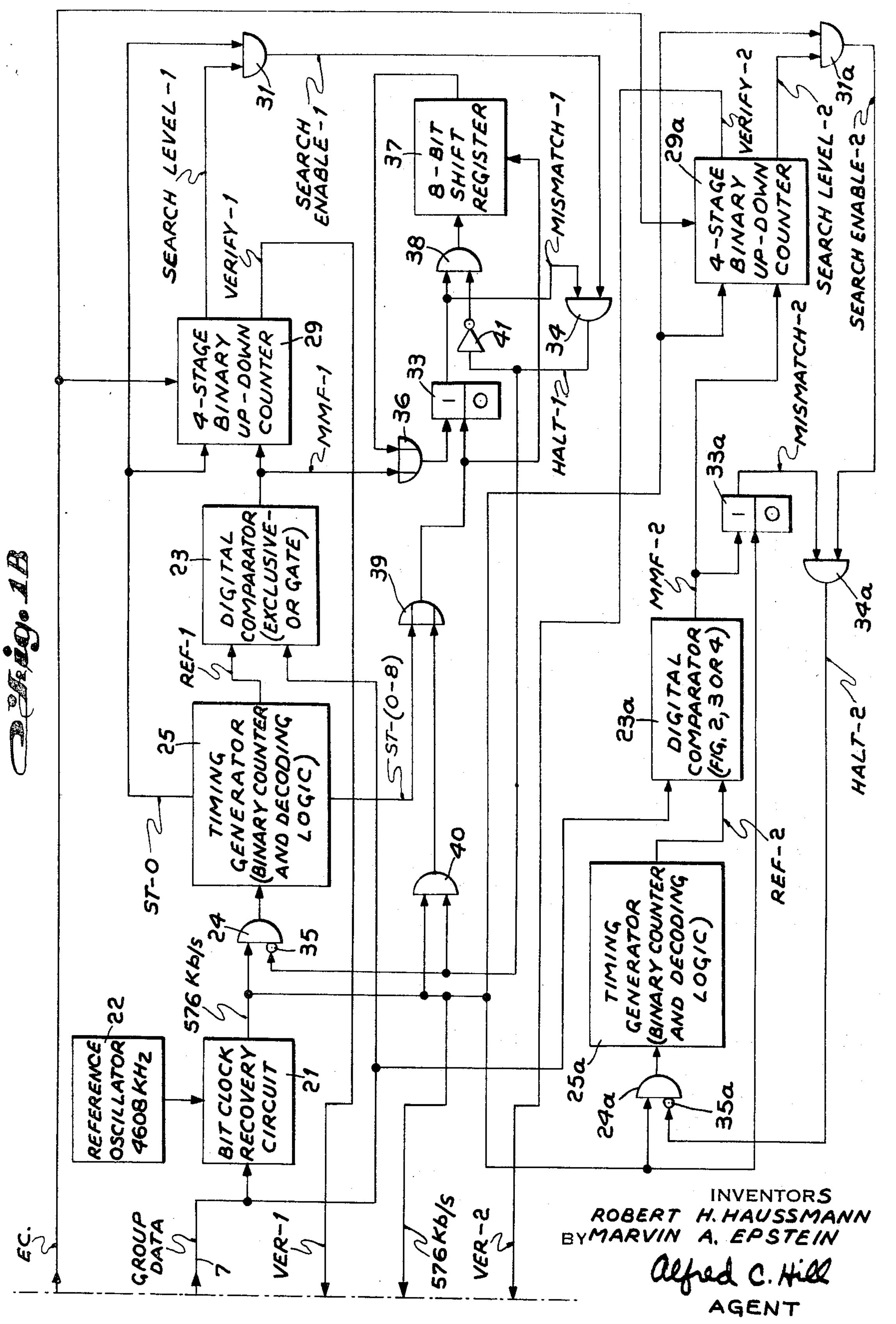

Data only is switched into input 7, therefore, a bit clock recovery circuit 21 operating in conjunction with reference oscillator 22 must be provided as illustrated in FIG. 1B. A simple digital bit clock recovery system is acceptable since the frame recovery logic is not affected by timing jitter. However, it would also be possible to employ a bit clock recovery circuit as fully described in the copending application of M. A. Epstein, Ser. No. 30,788, Filed Apr. 22, 1970 now U.S. Pat. No. 3,633,115, issued on Jan. 4, 1972 whose disclosure is incorporated herein by reference. The clock recovery circuit eliminates the requirement for sixteen clock switches on the group modules, and also eliminates false sensing of the transmit group signals due to malfunction of their clock recovery circuit.

Referring to FIG. 1B, the group data switched onto input 7 by the decoders 2 and 4 of FIG. 1A are applied to circuit 21 and also to digital comparators 23 and 23*a*. Circuit 21 recovers the bit clock from the data on input 7 with this bit clock being coupled through INHIBIT gate 24 to timing generator 25 which produces a reference signal REF-1 and for application to comparator 23 and through INHIBIT gate 24*a* to timing generator 25*a* which produces a reference signal REF-2 for application to comparator 23*a*. Generator 25 also produce other timing signals for operation of the remaining logic. One of these signals which identifies the time at which the group sync signal should occur is identified as ST-0. The sync time signal ST-0 has the width of one clock bit and occurs once each frame in each group of channel signals. Another timing signal which produced by generator 25 which actually is a group of pulses having the width of a clock bit and at the bit rate identified as ST-(0-8). The sync time for the dummy sync is defined by the bit clock at the output of circuit 21 due to the nature of the dummy sync and the dummy data formed by repeating the dummy sync pattern.

An example of the normal sync signal that is employed is an alternating 1,0 sync pattern occurring in adjacent frames of each group while an example of the dummy pattern is a lumped sync code pattern of 001 which occurs every 3 bits in a group of channel signals.

To provide the proper comparison in comparator 23, generator 25 produces as REF-1 a 4 kilohertz square wave or reference pattern corresponding to the repetition rate and binary condition of the normal sync pattern. Due to the normal sync pattern having only one bit in every frame of a particular group, comparator 23 may be in the form of an EXCLUSIVE-OR gate.

Figure 2:
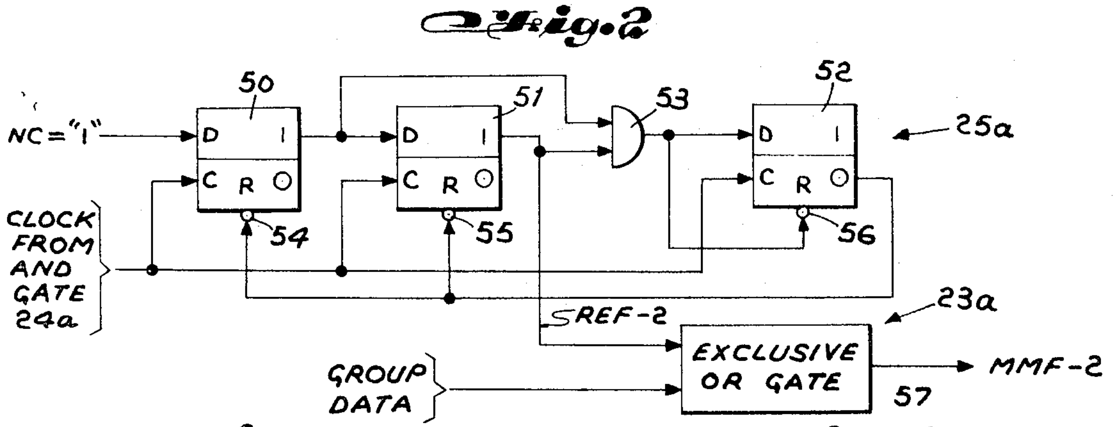
FIG. 2 is a schematic diagram in block form of one embodiment of the timing signal generator 25*a* and the digital comparator 23*a* of FIG. 1B.

Due to the nature of the dummy sync pattern, one embodiment of generator 25*a* and comparator 23*a* are illustrated in FIG. 2. Generator 25*a* includes a three state counter in the form of three D-type flip flops 50, 51 and 52 each of which are clocked by the bit rate clock from AND gate 24*a*. When both flip flops 50 and 51 are in the binary 1 state, AND gate 53 causes flip flop 52 to go to the binary 1 state which resets flip flops 50 and 51 through NOT gates 54 and 55. Upon resetting of flip flops 50 and 51, AND gate 53 produces a binary 0 output which through NOT gate 56 reset flip flop 52. The operation and states of flip flops 50, 51 and 52 is illustrated in the following TABLE:

TABLE

| Flip flop 50 | Flip flop 51 | Flip flops 52 |
|---|---|---|
| 0 | 0 | 1→0 |
| 1 | 0 | 0 |
| 1 | 1 | 0 |
| 0 | 0 | 1→0 |
| 1 | 0 | 0 |

Employing this circuit for generator 25*a* it is possible to provide a reference pattern of either 110 or 001 (the complement of 110) depending upon whether REF-2 is taken from flip flop 50 or flip flop 51. Depending upon the decoding gates employed either pattern can be used as the signal REF-2. This circuit may also be used as generator 19 of FIG. 1A as mentioned above. Employing the 1 output of flip flop 51, REF-2 signal has a 001 pattern which may be compared with the group data input in EXCLUSIVE-OR gate 57 serving as comparator 23*a*.

Figure 3:
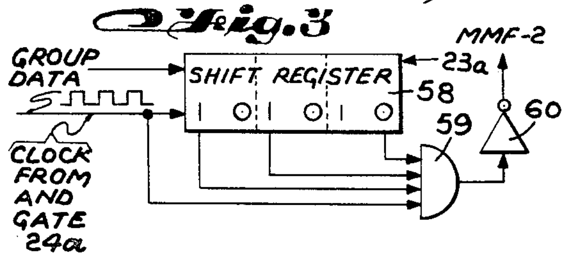
FIGS. 3 and 4 are schematic diagrams in block form of two embodiments of the digital comparator 23*a*, enabling the elimination of the timing signal generator 25*a*, of FIG. 1B.
Figure 4:
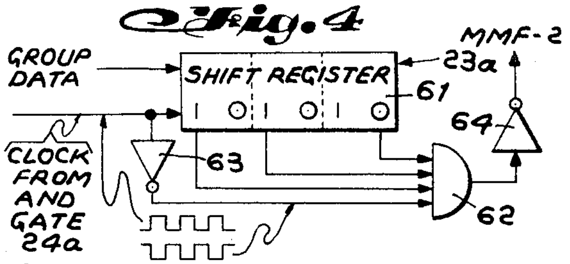

Alternatively, generator 25*a* may be eliminated altogether by employing for comparator 23*a* either of the embodiments of FIGS. 3 and 4.

In FIG. 3 a three-stage shift register 58 is provided by J-L type flip flops. The group data is clocked into register 58 by the trailing edge of the bit clock from AND gate 24*a*. AND gate 59 is coupled to the appropriate output of the three stages of register 58. As illustrated AND gate 59 will detect the dummy sync pattern 110, upon examination of the dummy data bits at the bit rate, when this pattern 110 is present in register 58. An output signal representing a sync match is provided at the output of AND gate 59 when the bit clock from gate 24*a* is high. The delay between clocking register and enabling gate 59 is to provide time for the contents register 58 to settle down. The output signal of gate 59 is inverted by NOT gate 60 to provide the desired MMF-2 signal where a match is equal to binary 0 and a mismatch is equal to binary 1.

In FIG. 4 a three-stage shift register 61 is provided by D-type flip flops. The group data is clocked into register 61 by the leading edge of the bit clock from gate 24*a*. AND gate 62 is coupled to register 61 to detect the dummy sync pattern 110, upon examination of the dummy data bits at the bit rate, when this pattern 110 is present in register 61. An output signal representing a sync match is provided at the output of gate 62 when the bit clock at the output of NOT gate 63 is high. The delay provided by inverting the bit clock at the output of gate 24*a* in gate 63 is to provide time for the contents of register 61 to settle down. The output of gate 63 is inverted by NOT gate 64 to provide the desired MMF-2 signal.

Returning now to FIG. 1B the output of comparators 23 and 23*a* are coupled to their own four stage binary up-down counters 29 and 29*a*, respectively. Counters 29 and 29*a* function as digital integrators. Counter 29 is also coupled to the timing signal ST-0 coming from generator 25 to assure that counter 29 actually counts only during sync time as defined by the ST-0 timing signal. Counter 29a is also coupled to the output of circuit 21 since sync time for the dummy sync is every bit of the group data. Thus, counter 29a counts at every clock bit. The match or mismatch information (a binary 1 is a mismatch and a binary 0 is a match) from comparators 23 and 23*a* is used to activate up-down counters 29 and 29*a*, respectively through appropriate logic circuitry. One mismatch steps the counters 29 and 29*a* down one count, and two matches step counters 29 and 29*a* up one count.

When the count is one or zero, that is the count is below the count threshold of count two of counters 29 and 29*a*, there is produced a binary 1 condition for the search level output conductor which is coupled to AND gate 31 and 31*a*, respectively. When counters 29 and 29*a* reach a count of two or greater, a binary 0 condition is present on the search level conductor and indicates that the search logic is in a sense rather than a search mode. The other input to AND gates 31 and 31*a* is the timing signal ST-0 from generator 25 in the case of gate 31 and is the bit clock from circuit 21 in the case of gate 31*a*. In the case of the normal sync framing circuit, a SEARCH ENABLE -1 signal is produced when both the inputs to AND gate 31 are 1. In the case of the dummy sync framing circuit, a SEARCH ENABLE -2 signal is produced when the inputs to gate 31*a* are both binary 1.

The SEARCH ENABLE -1 signal at the output of AND gate 31 is combined with a mismatch condition stored in flip flop 33 in AND gate 34 which generates the HALT-1 control signal for this normal sync pattern sync circuit. The SEARCH ENABLE-2 signal at the output of AND gate 31*a* is combined with a mismatch condition stored in flip flop 33*a* in AND gate 34*a* which generates the HALT-2 control signal for the dummy sync pattern. When AND gate 34 produces a HALT-1 control signal this signal is applied to the inhibit terminal 35 of INHIBIT gate 24 which stops the application of bit clock to generator 25 thereby enabling the relative phase of the data group and the bit clock as well as other timing signals of timing generator 25 to change until a match is found in the data stream. When AND gate 34*a* produces a HALT-2 control signal this signal is applied to inhibit terminal 35*a* of INHIBIT gate 24*a* which stops the application of bit clock to generator 25*a* or in the case of FIGS. 3 and 4 shift registers 58 and 61 and gates 59 and 62. This enables the relative phase of the data grops and the bit clock as well as other timing signals generated by generator 25*a* to change until a match is found in the data stream.

When timing generator 25 is running (not in a search mode), a match, mismatch condition for the eight bits following the ST-0 timing signal is OR'ed in OR gate 36 with the output of the 8-bit shift register 37 and the results of the output of OR gate 36 are stored in shift register 37 through the cooperation of flip-flop 33 and AND gate 38. The advancing or storing of the bits from OR gate 36 in flip-flop 33 and in register 37 are controlled by a trigger pulse generated in OR gate 39 receiving as one input the ST-(0-8) timing pulses from generator 25 and as its other input the bit rate clock from circuit 21 through AND gate 40 which is coupled to circuit 21 and is enabled only during the presence of HALT-1 signal. When there is HALT-1 condition at the output of AND gate 34, this binary 1 condition is inverted in inverter 41 to disable AND gate 38 and, hence, prevent the shifting of the results of the OR-ing of the information in OR gate 36. A more detailed description of this "look-ahead" technique for the determining the existence of synchronization is presented in the above-cited U.S. Pat. No. 3,594,502 whose disclosure is incorporated by reference. The purpose of this "look-ahead" technique is to enable the history of mismatches for the eight bits following the sync time timing signal ST-0 to be accmulated and aids in rejecting false phases when in a search mode.

If sufficient matches are accumulated in either of the up-down counters 29 and 29*a*, a verify signal is provided having a binary 1 condition. This verify signal occurs when the counter is full. The verify signal from counter 29 is identified as VERIFY-1 and the verify signal from counter 29*a* is identified as VERIFY -2. These two signals together with the bit clock are coupled to the search time control circuitry illustrated in FIG. 1A. The frame search time cycle control circuitry includes retriggerable, monostable multivibrator 42, OR gate 43, retiming flip flop 12 and counter 1 and performs three functions. The first function is performed by counter 1 which generates in cooperation with decoders 2 and 4 the group gate signals to select one of sixteen group data signals to be monitored by the circuitry of FIG. 1B. Counter 1 is incremented by the end of cycle pulse EC at the output of flip flop 12 which is a binary 1 output signal. This binary 1 output signal is provided when either of the verify signals VERIFY-1 or VERIFY-2 achieves a binary 1 condition, or multivibrator 42 provides a binary 1 condition at its 0 output, that is, when multivibrator 42 returns to its stable state after being in its unstable state for the predetermined maximum search time available to the sync search circuits of FIG. 1B. Thus, the first of the input signals to OR gate 43 that achieves a binary 1 condition is applied to flip flop 12 and flip flop 12 changes its state upon the occurrence of the next bit clock applied thereto to thereby increment counter 1.

If multivibrator 42 times out, produces a binary 1 output from its 0 output, this indicates that neither of the two sync patterns were detected and an alarm signal is produced. This alarm signal is produced by OR gate 44 which will produce a binary 0 output when both VERIFY-1 and -2 are binary 0. This binary 0 condition is inverted in inverter 45 and applied to alarm flip flops 14 and 15 to actuate an alarm indicator in the station and also to control the flip flop 15 to bring about the desired substitution of dummy data for the group being monitored that is in the out-of-sync condition.

The third function of this logic circuit is also to keep track of the presence of a dummy pattern which is indicated by VERIFY-2 signal having a binary 1 condition. The fourth bit of counter 1 at the time of signal EC out of flip flop 12 through means of AND gate 46 controls shifting the VERIFY-2 signal into the 16-bit shift register 47 which activates OR gate 48 connected in parallel to the shift register 47 so as to activate a "processing dummy" indicator.

Figure 5:
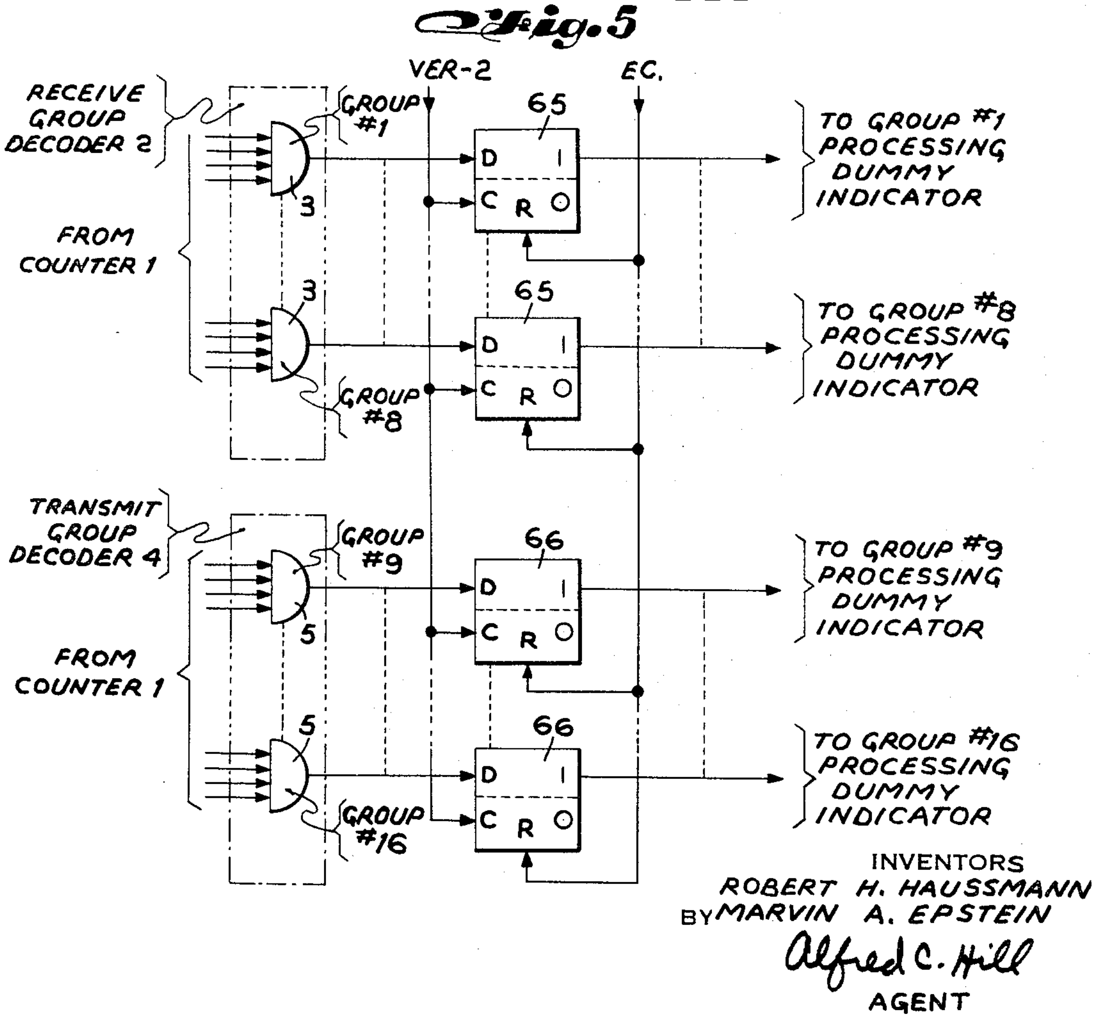
FIG. 5 is a schematic diagram in block form of an individual per group processing dummy data indicator actuation circuit that may be substituted for shift register 47 of FIG. 1A.

As hereinabove mentioned register 47 and gate 48 provides a signal in response to VERIFY-2 signal to activate a "processing-dummy" indicator. Such an arrangement, however, does not provide an indication of which group is "processing dummy." Referring to FIG. 5 there is illustrated therein an arrangement to substituted for or employed in combination with register 47 and gate 48 to permit the activation of a "processing dummy" indicator for each of the groups so that an operator will know which group has dummy data. The arrangement of FIG. 5 includes D-type flip flops 65 coupled to the group gates 3 and D-type flip flops 66 coupled to group gates 5. The VERIFY-2 signal clocks each of the flip flops 65 and 66 and if there is an output from the associated one of the group gates a high output will result from the associated one of flip flops 65 and 66 to thereby actuate the associated "processing dummy" indicator. The signal EC is used as a reset signal for each of the flip flops 65 and 66.

When there is an EC signal (binary 1) from flip flop 12 not only is counter 1 incremented to select the next group gate signal, but also multivibrator 42 is retriggered to its unstable state to restart the production of the pulse identifying the maximum search time available and counters 29 and 29*a* are reset to an empty condition to guarantee an active search mode for the start of the next search cycle.

As previously mentioned, if the supergroup signal received is out-of-sync as detected by circuit 9, a dummy control signal is produced at the output of OR gate 10. A dummy control signal is also produced at the output of OR gate 10 when a common functional alarm occurs in the receive common equipment 49 which is more fully disclosed and described in the copending application of J. M. Clark and R. H. Hausmann, Ser. No. 244,753, filed Apr. 17, 1972 whose disclosure is incorporated herein by reference. The produced dummy control signal brings about the automatic substitution of dummy data for the normal data of the group being monitored as described hereinabove. In addition, this dummy control signal, as described hereinabove, inhibits the fourth bit of counter 1 through means of flip flop 11 so that only the eight receive groups are monitored by the sync detection, establishing and maintenance circuitry of FIG. 1B.

While we have described above the principles of our invention in connection with specific apparatus it is to be more clearly understood that this description is made only by way of example and not as a limitation to the scope of our invention as set forth in the objects thereof and in the accompanying claims.

We claim:

1. A frame synchronization system for a time division multiplex binary data station comprising:

at least a first source of binary data signals including in each of repetitive predetermined length frame periods M time multiplexed groups of time multiplexed channel signals, each of said M groups including any one of *m* different sync signals, where M and *m* are integers greater than one;

an input;

first means coupled to said first source and said input to couple said M groups time sequentially to said input;

second means to produce a first timing signal having a frequency equal to the bit rate of said binary data signals;

$m$ third means each having first and second inputs, said first input of each of said m third means being coupled to said input, each of said $m$ third means responding to a different one of said $m$ sync signals, each of said $m$ third means examining successive bits in each of said M groups within each of said frame periods to determine the presence of its associated one of said $m$ sync signals and to produce a phase control signal in the absence of its associated one of said $m$ sync signals in a given number of successive bits; and $m$ fourth means each coupled to the output of a different associated one of said $m$ third means and between said second means and said second input of the associated one of said $m$ third means responsive to the associated one of said control signals to control the phase of said first timing signal with respect to those of said M groups having the associated one of said $m$ sync signals responsible for producing the associated one of said control signals to establish and maintain synchronization.

2. A system according to claim 1, wherein each of said third means includes a digital comparator coupled to said input, and an integrator having a search threshold coupled to the output of said comparator to produce said control signal.

3. A system according to claim 2, wherein said integrator includes an up-down binary counter having a search count threshold to produce said control signal.

4. A system according to claim 3, wherein at least one of said third means further includes a timing signal generator to produce a reference signal and second timing signal to define the time that said sync signals should occur and;

the associated one of said comparators is coupled to said timing signal generator and said input to compare said reference signal with said successive bits; and at least one of said fourth means includes first logic circuitry coupled between said second means and said timing signal generator to normally couple said first timing signal to said timing signal generator, and second logic circuitry coupled to one of said third means, said timing signal generator, and said first logic circuitry responsive to said second timing signal and its associated one of said control signals when its associated one of said counters is below said count threshold to place said associated one of said control signals in a binary 1 condition to produce a signal for coupling to said first logic circuitry to halt the coupling of said first timing signal to said timing signal generator to enable said phase control.

5. A system according to claim 3, wherein at least one of said third means further includes a timing signal generator to produce a reference signal and second timing signal to define the time that said sync signals should occur; and the associated one of said comparators is coupled to said timing signal generator and said input to compare said reference signal with said successive bits; and at least one of said fourth means includes logic circuitry coupled between said second means and said timing signal generator to normally couple said first timing signal to said timing signal generator, a first AND gate coupled to said one of said third means and said timing signal generator responsive to said second timing signal and its associated one of said control signals when its associated one of said counters is below said count threshold to place said associated one of said control signals in a binary 1 condition to produce a search enable signal, storage means to store the results of a given number of previous comparisons of its associated one of said comparators, a two input OR gate having one input coupled to the output of said comparator of said one of said third means, the other input coupled to the output of said storage means and an output coupled to the input of said storage means, and a second AND gate coupled to said first AND gate and the output of said OR gate responsive to a binary 1 output of said OR gate and said search enable signal to produce a signal for coupling to said logic circuitry to halt the coupling of said first timing signal to said timing signal generator to enable said phase control.

6. A system according to claim 3, wherein at least one of said comparators includes a shift register coupled to said input to store said binary data signals at said bit rate, and first logic circuitry coupled to said shift register and the input of the associated one of said counters to examine said successive bits at said bit rate to determine the presence and absence of the associated one of said $m$ sync signals.

7. A system according to claim 6, wherein said fourth means associated with said one of said comparators further includes second logic circuitry coupled between said second means and said shift register and between said second means and said first logic circuitry to normally couple said first timing signal to said shift register and said first logic circuitry, and third logic circuitry coupled to the associated one of said counters, said second means and said second logic circuitry responsive to said first timing signal and its associated one of said control signals when said associated one of said counters is below said count threshold to place said associated one of said control signals in a binary 1 condition to produce a signal for coupling to said second logic circuitry to halt the coupling of said first timing signal to said shift register to enable said phase control.

8. A system according to claim 3, wherein at least one of said third means further includes a timing signal generator to produce at said bit rate a reference signal in the form of a predetermined pattern of binary 1 and binary 0, and the associated one of said digital comparators is coupled to said timing signal generator and said input to compare at said bit rate said reference signal with said successive bits to determine the presence and absence of the associated one of said m sync signals.

9. A system according to claim 8, wherein said fourth means associated with said one of said third means further includes first logic circuitry coupled between said second means and said timing signal generator to normally couple said first timing signal to said timing signal generator, and second logic circuitry coupled to the associated one of said counters said first logic circuitry and said second means responsive to said first timing signal and the associated one of said control signals when said associated one of said counters is below said count threshold to place said associated one of said control signals in a binary 1 condition to produce a signal for coupling to said first logic circuitry to halt the coupling of said first timing signal to said timing signal generator to enable said phase control.

10. A system according to claim 3, wherein

*m* is equal to two;

one of said third means further includes a first timing signal generator coupled to the input of said comparator to produce a first reference signal and second timing signal to define the time that said sync signals should occur;

the other of said third means further includes a second timing signal generator to produce a second reference signal;

one of said fourth means includes first logic circuitry coupled between said second means and said second timing signal generator to normally couple said first timing signal to said second timing signal generator; and a first AND gate coupled to the associated one of said counters and said second means responsive to said first timing signal and its associated one of said control signal when its associated one of said counters is below said count threshold to place said associated one of said control signals in a binary 1 condition to produce a first signal for coupling to said first logic circuitry to halt the coupling of said first timing signal to said timing signal generator to enable said phase control; and the other of said fourth means includes second logic circuitry coupled between said second means and said first timing signal generator to normally couple said first timing signal to said first timing signal generator, a second AND gate coupled to the associated one of said counters and said first timing signal generator responsive to said second timing signal and its associated one of said control signals when its associated one of said counters is below said count threshold to place said associated one of said control signals in a binary 1 condition to produce a search enable signal, storage means to store the results of a given number of previous comparisons of its associated one of said comparators, a two input OR gate having one input coupled to the output of its associated one of said comparators, the other input coupled to the output of said storage means and an output coupled to the input of said storage means, and a third AND gate coupled to said second AND gate and the output of said OR gate responsive to a binary 1 output of said OR gate and said search enable signal to produce a signal signal for coupling to said second logic circuitry to halt the coupling of said first timing signal to said timing signal generator to enable said phase control.

11. A system according to claim 3, wherein

*m* is equal to two;

one of said third means includes as its digital comparator a shift register coupled to said input to store said binary data signals at said bit rate, and first logic circuitry coupled to said shift register and the input of the associated one of said counters to examine said successive bits at said bit rate to determine the presence or absence of the associated one of said m sync signals;

the other of said third means further includes a timing signal generator to produce a reference signal;

one of said fourth means includes second logic circuitry coupled between said second means and said shift register and between said second means and said first logic circuitry to normally couple said first timing signal to said shift register and said first logic circuitry, and a first AND gate coupled to the associated one of said counters and said second means responsive to said first timing signal and its associated one of said control signals when its associated one of said counters is below said count threshold to place said associated one of said control signals in a binary 1 condition to produce a first control signal for coupling to said second logic circuitry to halt the coupling of said first timing signal to said shift register and said first logic circuitry to enable said phase control; and the other of said fourth means includes third logic circuitry coupled between said second means and said timing signal generator to normally couple said first timing signal to said timing signal generator, a second AND gate coupled to the associated one of said counters and said second means responsive to said first timing signal and its associated one of said control signals when its associated one of said counters is below said count threshold to place said associated one of said control signals in a binary 1 condition to produce a search enable signal, storage means to store the results of a given number of previous comparisons of its associated one of said comparators, a two input OR gate having one input coupled to the output of its associated one of said comparators, the other input coupled to the output of said storage means and an output coupled to the input of said storage means, and a third AND gate coupled to said second AND gate and the output of said OR gate responsive to a binary 1 output of said OR gate and said search enable signal to produce a second signal for coupling to said third logic circuitry to halt the coupling of said first timing signal to said timing signal generator to enable said phase control.

12. A system according to claim 1, further including a second source of binary data signals including in each of said predetermined length frame period M time multiplexed groups of time multiplexed channel signals, each of said M groups of channel signals including one of $m$ different sync signals; and wherein said first means is coupled to both said first and second sources and said input to couple said M groups of channel signals of said first source and said M groups of channel signals of said second source time sequentially to said input.

13. A system according to claim 12, wherein said M groups of channel signals of one of said first and second sources are received at said station, and said M groups of channel signals of the other of said first and second sources are to be transmitted from said station.

14. A system according to claim 12, wherein said first means includes a second source of pulses having a repetition rate proportional to the length of time to establish said synchronization when any one of said control signals indicate an out-of-synchronization condition, an $n$ stage binary counter coupled to said second source to count said pulses therefrom, where $n$ is an integer greater than one predetermined by the equation $2M = 2^n$, logic decoder coupled to said counter to produce 2M group gate signals determined by the binary condition of said stages of said counter, and a gating arrangement coupled to said decoder, said first and second sources and said input to couple said M groups of channel signals of said first and second source time sequentially to said input.

15. A system according to claim 14, wherein each of said third means further produces a verify signal having a binary 1 condition at a variable time within a given maximum time to establish synchronization after the associated one of said control signals indicates an out-of-synchronization condition, said verify signal indicating that synchronization has been established, and said second source includes a retriggerable monostable multivibrator producing a pulse having a width equal to said given maximum time, and an $(m+1)$ input OR gate having one input coupled to an output of said monostable multivibrator producing a binary 1 condition responsive to the resetting thereof at the end of said given maximum time, $m$ inputs each coupled to a different one of said third means and responsive to the associated one of said verify signals, and an output to provide said pulses of said second source coupled to said counter at the time one of the inputs to said OR gate first assumes a binary 1 condition, said pulses of said second source coupled to said counter also being coupled to said monostable multivibrator for triggering thereof to restart the production of said pulse having a width equal to said given maximum time and for resetting each of said third means.

16. A system according to claim 1, wherein said first means includes a second source of pulses having a repetition rate proportional to the length of time to establish said synchronization when any one of said control signals indicate an out-of-synchronization condition, an n stage binary counter coupled to said second source to count said pulses therefrom, where $n$ is an integer greater than one predetermined by the equation $M = 2^n$, logic decoder coupled to said counter to produce M group gate signals determined by the binary condition of said stages of said counter, and a gating arrangement coupled to said decoder, said first source and said input to couple said M groups of channel signals of said first source time sequentially to said input.

17. A system according to claim 16, wherein each of said third means further produces a verify signal having a binary 1 condition at a variable time within a given maximum time to establish synchronization after the associated one of said control signals indicates an out-of-synchronization condition, said verify signal indicating that synchronization has been established, and said second source includes a retriggerable monostable multivibrator producing a pulse having a width equal to said given maximum time, and an $(m+1)$ input OR gate having one input coupled to an output of said monostable multivibrator producing a binary 1 condition responsive to the resetting thereof at the end of said given maximum time, $m$ inputs each coupled to a different one of said third means and responsive to the associated one of said verify signals, and an output to provide said pulses of said second source coupled to said counter at the time one of the inputs to said OR gate first assumes a binary 1 condition, said pulses of said second source coupled to said counter also being coupled to said monostable multivibrator for triggering thereof to restart the production of said pulse having a width equal to said given maximum time and for resetting each of said third means.

18. A system according to claim 1, further including fifth means coupled to each of said third means and said first means to provide a variable length of search time to establish said synchronization when any one of said control signals indicates an out-of-synchronization condition.

19. A system according to claim 18, wherein each of said third means further produces a verify signal having a binary 1 condition at a variable time within a given maximum time to establish synchronization after the associated one of said control signals indicates an out-of-synchronization condition, said verify signal indicating that synchronization has been established, and said fifth means includes a retriggerable monostable multivibrator producing a binary 1 condition after said given time, and an OR gate having $(m+1)$ inputs, one input being coupled to said multivibrator and m inputs each coupled to a different one of said third means and responsive to the associated one of said verify signals, and an output to provide an output binary 1 control signal upon occurrence of the first binary 1 condition appearing on said $(m+1)$ inputs, said output binary 1 control signal being coupled to said multivibrator, each of said third means and said first means for retriggering said multivibrator to restart said given time, to reset each of said third means, and to activate said first means to apply the next of said M groups of channel signals to said input.

20. A frame synchronization system for a time division multiplex binary data system comprising:

a source of binary data time division multiplex signals including in each of repetitive predetermined length frame periods at least one sync signal;

first means to produce a timing signal having a frequency equal to the bit rate of said binary data signals;

second means coupled to said source and said first means to examine successive bits in each of said frame periods to determine the presence of said sync signal and to produce from said examination a phase control signal in the absence of said sync signal in a given number of successive bits;

third means coupled to said second means and said first means responsive to said control signal to control the phase of said timing signal coupled to said second means to establish and maintain synchronization; and fourth means coupled to said second means, said fourth means establishing a given maximum search time which is capable of being interrupted at a variable time within said given time to provide a variable length of search time to establish said synchronization when said control signal indicates an out-of-synchronization condition.

21. A system according to claim 20, wherein said second means further produces a verify signal having a binary 1 condition at said variable time within said given time to establish synchronization after said control signal indicates an out-of-synchronization condition, said verify signal indicating that synchronization has been established, and said fourth means includes a retriggerable monostable multivibrator producing a binary 1 condition after said given time, and an OR gate having two inputs, one of said inputs being coupled to said multivibrator and the other input being coupled to said second means responsive to said verify signal, and an output to provide an output binary 1 control signal upon occurrence of the first binary 1 condition appearing on said two inputs, said output binary 1 control signal being coupled to said multivibrator and said second means to retrigger said multivibrator to restart said given time and to reset said second means.

* * * * *